United States Patent [19]
Hamilton

[11] 3,800,216
[45] Mar. 26, 1974

[54] CABLE FAULT LOCATOR APPARATUS AND METHOD WITH REFERENCE VOLTAGE COMPARISON

[75] Inventor: Robert H. Hamilton, Portola Valley, Calif.

[73] Assignee: Dynatel Corporation, Sunnyvale, Calif.

[22] Filed: Aug. 11, 1971

[21] Appl. No.: 170,721

[52] U.S. Cl. ............................................. 324/52
[51] Int. Cl. ............................................ G01r 31/08
[58] Field of Search .................... 324/52, 63, 98, 99

[56] References Cited
UNITED STATES PATENTS

| | | | |
|---|---|---|---|
| 1,084,910 | 1/1914 | Stephenson | 324/52 |
| 3,421,083 | 1/1969 | Bosworth et al. | 324/99 R |
| 3,382,433 | 5/1968 | Escue | 324/63 |
| 3,248,646 | 4/1966 | Brazee | 324/52 |
| 3,423,680 | 1/1969 | Julie | 324/98 |
| 3,025,468 | 3/1962 | Thomas | 324/158 T |

OTHER PUBLICATIONS

Stubbings, G. W.; Fault Localisation, Electrical Review Dec. 28, 1945, pp. 947–949

*Primary Examiner*—Gerard R. Strecker
*Attorney, Agent, or Firm*—Flehr, Hohbach, Test, Albritton & Herbert

[57] ABSTRACT

Cable fault locator and method in which a calibrated current of constant magnitude is passed through a conductor to provide a known voltage drop per unit length. The drop across a desired portion of the conductor is compared with a reference voltage which is set by a dial calibrated in units of length. The length of the portion of the conductor under test is read directly from this dial. An ohmmeter and voltmeter are provided for discovering and analyzing faults in the cable, and an adjustable voltage source is provided for cancelling the effects of external voltages on the conductors. The entire system is incorporated in a compact highly portable instrument.

14 Claims, 2 Drawing Figures

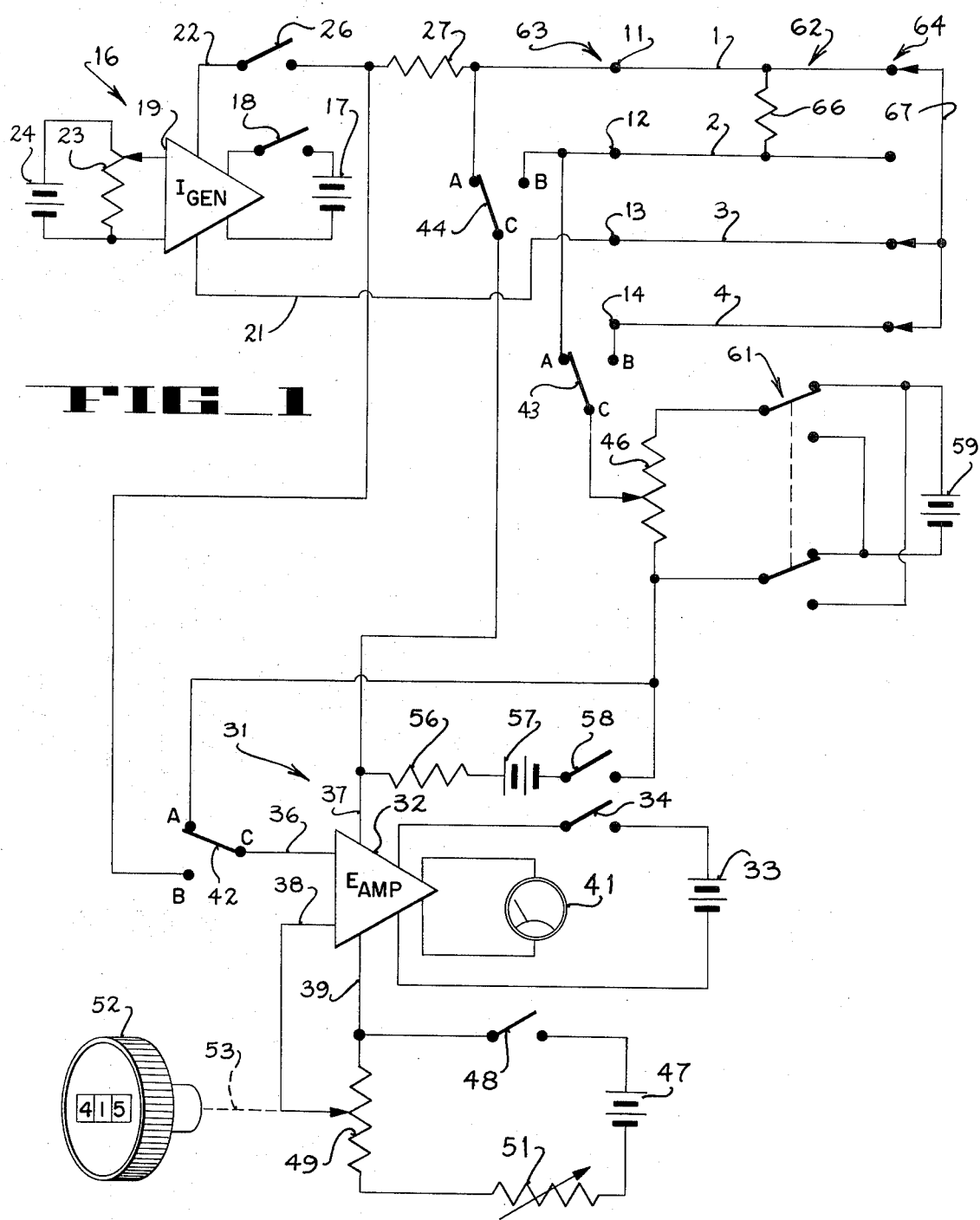
FIG_1

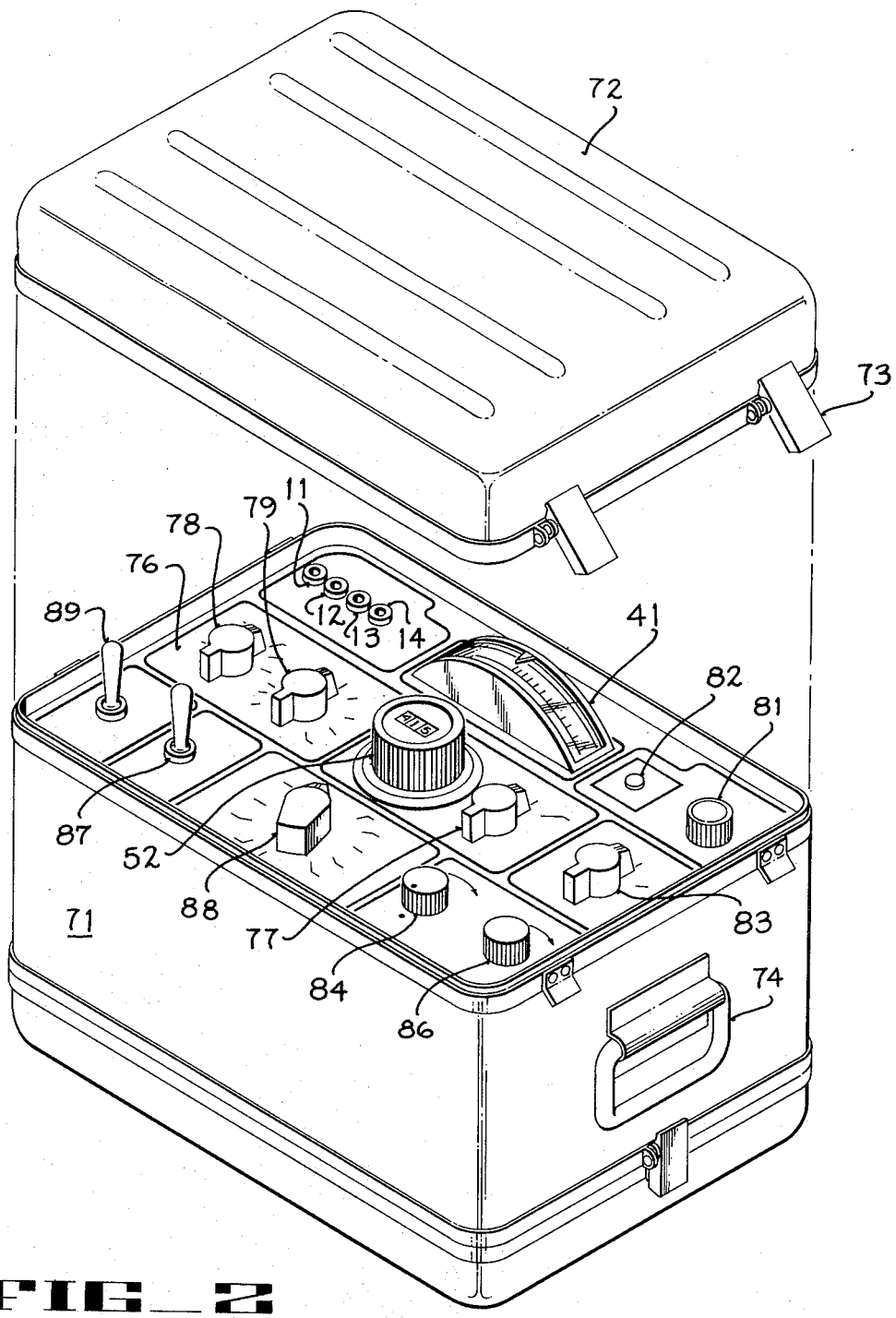
FIG_2

CABLE FAULT LOCATOR APPARATUS AND METHOD WITH REFERENCE VOLTAGE COMPARISON

BACKGROUND OF THE INVENTION

This invention pertains generally to electronic test instruments and more particularly to a method and apparatus for locating and analyzing faults between the conductors of a cable.

Cables having large numbers of insulated conductors are widely used today, for example, in telephone communication systems. Frequently these cables are either buried underground or suspended from poles or towers above the ground. Faults sometimes develop between two or more of the conductors of these cables, requiring repair or replacement of the cable or a portion thereof. Such faults typically include a short circuit between two or more of the conductors, a partial breakdown of the insulation between the conductors and high resistance connections caused by water or moisture within the cable. To facilitate the correction of a fault, it is desirable to know the exact location of the fault. This is particularly true in the case of underground cables where a hole must generally be dug to permit access to the troubled area.

Access points are generally provided at pedestals or towers located at spaced apart positions along underground cables and aerial cables. Heretofore, there have been some attempts to determine the location of a fault between the conductors of a cable by means of measurements made on the cable at one of the access points. In one widely used technique of the prior art, a bridge circuit, such as a Varley bridge, is used to determine the resistance between the access point and the fault. From the value of resistance measured, the lineman or repairman calculates the length of the conductor. This approach has several disadvantages. For example, it requires complicated calculations on the part of the lineman or repairman. Resolution drops off toward the ends of the cable, making it difficult to locate faults accurately in these areas. Sensitivity is relatively poor, and is not possible to locate some high resistance faults with the bridge approach. Also, bridges typically pass currents on the order of hundreds or thousands of microamperes through the faulty conductor, and currents of this level sometimes dry out or temporarily eliminate the fault, thereby preventing its location and correction.

SUMMARY AND OBJECTS OF THE INVENTION

The fault locator and method of the present invention provide means for easily and accurately locating faults in a cable from a single access point. The invention includes an ohmmeter and a voltmeter for analyzing the condition of the cable to determine good and bad conductors. Means is included for cancelling the effects of a foreign voltage on the conductors so that the ohmmeter can read fault resistance correctly even in the presence of such a voltage. To determine the location of a fault between two conductors, a calibrated current of constant magnitude is passed through one of the bad conductors to produce a known potential drop per unit length along this conductor. The potential drop along a desired portion of the conductor is measured by the voltmeter and compared with a reference voltage. The level of the reference voltage is adjusted by a control having a dial calibrated in units of length, and when the reference voltage corresponds to the measured drop across a portion off the conductor, this dial indicates the length of the conductor portion directly in units of length. Means is included for adjusting the level of the current and reference voltage in accordance with factors such as the size, material and temperature of the conductor so that the system can be accurately calibrated for the particular cable under test. Since the current passed through the conductor is a constant current, the potential drops along the conductor are linear, and the calibration of the dial in units of length is likewise linear. The invention can be constructed in a compact highly portable instrument which is easy to operate.

It is in general an object of the present invention to provide a new and improved method and apparatus for locating faults in a cable.

Another object of the invention is to provide a method and apparatus of the above character which indicates the distance to a fault directly in units of length.

Another object of the invention is to provide a method and apparatus of the above character whose operation is linear.

Another object of the invention is to provide a method and apparatus of the above character which will operate even in the presence of a foreign voltage on one or more of the conductors.

Another object of the invention is to provide a method and apparatus of the above character which can be incorporated in a compact highly portable instrument.

Additional objects and features of the invention will be apparent from the following description in which the preferred embodiments are set forth in detail in conjunction with the accompanying drawings.

BRIEF DESCRIPTION OF THE DRAWINGS

FIG. 1 is a simplified circuit diagram of one embodiment of a system incorporating the present invention.

FIG. 2 is a perspective view, partially exploded, of one embodiment of a portable instrument incorporating the invention.

DESCRIPTION OF THE PREFERRED EMBODIMENTS

The system illustrated in FIG. 1 includes four input terminals which are designated by the reference numerals 11–14. These terminals are adapted for connection to the conductors of a cable in a manner discussed more fully hereinafter.

The system also includes a current generator 16 which receives operating power from a source 17 through a switch 18. The generator 16 preferably functions as a constant current generator, and in the embodiment illustrated, an amplifier is connected to deliver a current of constant magnitude to leads 21 and 22. The level of this current can be adjusted by means of a potentiometer 23 which is connected between a voltage source 24 and the input terminals of the amplifier 19. In the preferred embodiments, the magnitude of the current produced by the generator is adjusted in accordance with the size and material of the conductors under test.

If desired, other types of current generators can be used for the generator 16. However, as indicated above, it is preferable that the generator used be capable of delivering a current of constant magnitude at an adjustable level.

One output of the current generator 16 is connected through the lead 21 to the input terminal 13. The other output of the generator is connected through the lead 22 to one side of a switch 26. The other side of this switch is connected to one side of a resistor 27, and the other side of this resistor is connected to the input terminal 11.

As is discussed more fully hereinafter, the resistor 27 provides means for calibrating the system for use with a conductor of a particular size. It is chosen to have a resistance equal to the resistance of a predetermined known length of a conductor in the cable under test. When it is contemplated that the system will be used for testing cables having conductors of different sizes, a plurality of calibration resistors can be provided. For example, on such resistor can be provided for each conductor wire size contemplated, and a suitable switch can be provided for selectively connecting these resistors into the circuit.

The system also includes a voltmeter 31. As illustrated, this voltmeter includes a voltage amplifier 32 which receives operating power from a source 33 through a switch 34. This amplifier has a first pair of input terminals 36, 37 and a second pair of input terminals 38, 39. A meter 41 is connected to the output of the amplifier to indicate the difference in the magnitudes of voltages applied to the pairs of input terminals. The amplifier preferably has a high input impedance so that it will not draw appreciable current from circuits connected thereto. The amplifier 32 can be a differential amplifier, in which case the terminals 36 and 37 would be connected to one input of the amplifier and the terminals 38 and 39 would be connected to the other input of the amplifier.

Means is provided for selectively connecting the voltmeter input terminals 36 and 37 to a plurality of different circuits As illustrated, this means includes switches 42, 43 and 44. Each of these switches has fixed contacts A and B and a movable contact which can make contact with either of the fixed contacts.

The amplifier input terminal 36 is connected to the movable contact C of the switch 42. The fixed contact A of this switch is connected through a potentiometer 46 to the movable contact of the switch 43. The fixed contacts of the switch 43 are connected to the input terminals 12 and 14 respectively, and the fixed contact B of the switch 42 is connected to the junction of the switch 26 and the resistor 27.

The voltmeter input terminal 37 is connected to the movable contact of the switch 44. The fixed contact A of this switch is connected to the junction of the resistor 27 and the input terminal 11, and the fixed contact B is connected to the input terminal 12.

Means is provided for applying a calibrated reference voltage to the voltmeter input terminals 38 and 39. This means includes a voltage source 47, and on-off switch 48, a potentio-meter 49 and a variable resistor 51 connected electrically in series. The movable contact or wiper of the potentiometer 49 is connected to the terminal 38, and the junction of the switch 48 and the top of the potentiometer 49 is connected to the terminal 39. The level of the reference voltage applied to the terminals 38 and 39 is determined by the settings of the potentiometer 49 and the variable resistor 51.

In the preferred embodiment, the potentiometer 49 is a ten-turn potentiometer which produces a linear change in resistance over 3600 degrees of shaft rotation. A three wheel digital counting dial 52 is mounted on the shaft of the potentiometer as indicated by dashed lines 53. This counter advances from 0 0 0 to 9 9 9 as the potentiometer shaft is moved through its 3,600° of rotation. As is discussed more fully hereinafter, this counter gives a direct reading of the length of a conductor.

The variable resistor 51 provides means for adjusting the level of the reference voltage in accordance with parameters such as the temperature of the conductors in a cable under test. This control can be provided with a dial which is calibrated in the desired units such as temperature.

Means is provided for adapting the voltmeter 31 to indicate the resistance of a circuit connected to the input terminals 11–14. This means includes a resistor 56, a voltage source 57 and a switch 58 connected electrically in series between the junction of the voltmeter input terminal 37 and the movable contact of the switch 44 and the junction of the bottom of the potentiometer 46 and the fixed contact A of the switch 42.

Means is also provided for cancelling the effects of any external which may be present at the input terminals 11–14. This means includes a voltage source 59, a polarity-reversing switch 61 and the potentiometer 46. The output of the battery 59 is applied across the potentiometer 46 with a polarity determined by the switch 61. The potentiometer provides means for applying a desired portion of this voltage in series with the voltage at the input terminals.

Operation and use of the fault locator and therein the method of the invention can now be described. Let it be assumed that the system is to be used to locate a fault between the conductors of a cable 62 which is accessible at a proximate station 63 and a remote station 64. The cable might, for example, be a buried cable, and the stations 63 and 64 might be pedestals or junction boxes spaced several hundred or several thousand feet apart.

The system can be used as an ohmmeter to determine the existence of a fault between two or more of the cable conductors. For this purpose, the switches 18, 26 and 48 are opened, the switches 34 and 58 are closed, the switches 42, 43 and 44 are replaced in their "A" positions, and the wiper is moved to the bottom of the potentiometer 46. The meter 41 will now indicate the resistance of a circuit connected between the input terminals 11 and 12, and a fault can be found by connecting successive pairs of the conductors to these terminals.

The conductors can be checked for foreign voltages by opening the switch 58, in which case the meter 41 will read the voltage between the terminals 11 and 12. If a foreign voltage is found to exist between any pair of conductors, its effect can be cancelled by adjusting the potentiometer 46 and the switch 61 to provide an off-setting voltage of equal magnitude at opposite plurality, as indicated by a zero reading on the meter 41. With the foreign voltage thus cancelled the switch 58 can be closed, and the resistance between the conductors can be measured in the normal manner.

Let be assumed that a fault 66 is found to exist between two conductors whch are designated by the reference numerals 1 and 2. To determine the location of the fault 66, the conductors 1 and 2 are connected to the input terminals 11 and 12, respectively, at the station 63. In addition, a pair of good conductors 3 and 4 are connected at the station 63 to the input terminals 13 and 14, respectively. These good conductors are insulated electrically from each other and from the conductors 1 and 2. They can be selected from the conductors of the cable 62, or they can be conductors which extend between the stations 63 and 64 externally of the cable. At the station 64, a low resistance connection 67, commonly known as a "strap", is made between the conductors 1, 3 and 4.

The system is now ready to be calibrated so that the dial 52 will indicate distances along the conductor 1 directly in units of length. For this purpose, the switches 18 and 26 are closed, and current from the generator flows through a loop which includes the resistor 27, the conductor 1 and the conductor 3. The switch 58 is opened, and the switch 42 is moved to its "B" position, thereby connecting the first pair of voltmeter terminals 36 and 37 across the resistor 27. The switch 48 is now closed to apply the reference voltage to the other pair of voltmeter terminasl 48 and 39, and the variable resistor 51 is adjusted to a value corresponding to the temperature of the conductors in the cable 62. The meter now reads the difference between the reference voltage and the voltage drop produced by the generator current passing through the resistor 27.

It will be recalled that the resistor 27 was chosen to have a value equal to the resistance of a known length of the conductor under test. In the present example, this resistor has a value corresponding to a known length of the conductor 1. The digital dial 52 on the control shaft of the potentiometer 49 is now set to this known length, and the level of the current produced by the generator is adjusted by means of the potentiometer 23 until the voltage drop across the resistor 27 is equal to the reference voltage, as indicated by a zero reading on the meter. The system is now calibrated and the dial 52 will indicate distances along the conductor 1 directly in units of length, as determined by the overall resistance of the potentiometer 49. In the preferred embodiment, the resistance of the potentiometer is chosen such that the dial 52 indicates distances in units of feet.

To measure the length of the conductor 1 between the stations 63 and 64, the switch 42 is moved to its "A" position, the switch 43 is moved to its "B" position, and the switch 44 is maintained in its "A" position. With the switches so arranged, the end of the conductor 1 at the station 63 is connected to the voltmeter terminal 37 through the input terminal 11 and the switch 44; and the end of the conductor 1 at the station 64 is connected to the voltmeter terminals 36 through the strap 67, conductor 4, input terminal 14, switch 43, potentiometer 46 and switch 42. Thus, the voltage drop produced by the generator current passing through the conductor 1 is present at the voltmeter input terminals 36 and 37. The potentiometer 49 is then adjusted until the reference voltage equals this drop, as indicated by a zero reading of the meter. When this reading is obtained, the dial 52 indicates the length of the conductor between the stations directly in units of length.

To determine the distance between the station 63 and the fault 66, the switch 43 is moved to its "A" position, and the other switches remain as before. The station 63 end of the conductor 1 is still connected to the voltmeter terminal 37, but now the point along the conductor in which the fault is located is connected to the voltmeter terminal 36 through the fault 66 itself, a portion of the conductor 2, the input terminal 12, switch 43, potentiometer 46, and switch 42. Thus, the voltage at the voltmeter terminals 36 and 37 is the drop produced by the generator current in the portion of the conductor between the station 63 and the fault. When the potentiometer 49 is adjusted so that the reference voltage equals this drop, as indicated by a zero reading of the meter, the dial 52 indicates the length of the conductor between the station 63 and the fault.

The distance between the strap 67 and the fault can also be measured. To do so, the switches 43 and 44 are both placed in their "B" positions. In this situation, at the point of the fault, the conductor 1 is connected to the voltmeter terminal 37 through the fault 66, a portion of the conductor 2, the input terminal 12, and the switch 44. The end of the conductor 1 at the station 64 is connected to the voltmeter 36 through the strap 67, conductor 4, input terminal 14, switch 43, potentiometer 46 and switch 42. Thus, the voltage at the voltmeter inputs 36 and 37 is the drop produced by the generator current flowing through the portion of the conductor between the fault and the strap. When the potentiometer 49 is adjusted to make the reference voltage equal to this drop, as indicated by a zero reading of the meter, the dial 52 indicates the distance along the conductor 1 between the fault and the strap.

An alternative method of calibration can be employed if the actual method of the conductor 1 is known. To do so, the switches 42 and 44 are placed in their "A" positions, and the switch 43 is placed in its "B" position. The voltage at the voltmeter terminals 36 and 37 is now equal to the drop produced by the generator current along the known length of the conductor between the stations 63 and 64. The potentiometer 49 is adjusted until the dial 52 indicates this known length, and the potentiometer 23 is adjusted until the drop across the conductor equals the reference voltage, as indicated by a zero reading of the meter. When this method of calibration is used, the resistor 27 is not needed, and there is no need to adjust the resistor 51 since the conductor itself is used as the standard for calibration. This method gives somewhat more accurate results than are possible when the resistors 27 and 51 are used to simulate the resistance and temperature of the conductor.

The invention described above has many desirable features. For example, the use of a calibrated current of constant magnitude produces a known voltage drop per unit length along the conductor. Because the magnitude of the current is maintained at a constant level, the voltage distribution along the conductor will be linear regardless of the length of the conductor. The length of a desired portion of the conductor is displayed directly in units of length by the digital counter and there is no need for cumbersome calculations to determine the exact location of a fault. From a single access point, the system will indicate the length of a conductor, the distance from the access point to a fault, and the distance from a remotely located strap to the fault. The sytem can be calibrated to measure distances within an accuracy of ± 1 percent by using internal standards to simulate the resistance per unit length and the temperature of the conductor. If the actual length of the conductor is known, the accuracy of the readings can be increased to about ± 0.015 percent by using the conductor itself as a standard for calibration. The system can be used to locate faults having a resistance as high as 5 megohms or more on conductors as long as 100,000 feet. Since the voltmeter amplifier 32 has a high input impedance, the current passed through the fault is on the order of 1 microampere or less, and there is virtually no chance of drying out an elusive fault. The operation of the system is not affected by external voltages on the conductors because such voltage can be cancelled out. The system can also be utilized to make resistance and voltage measures on the conductors.

FIG. 2 illustrates a compact highly portable instrument incorporating the invention. This instrument includes a carrying case or cabinet 71 which is provided with a removable cover 72. A plurality of latches 73 are provided for securing the cover to the lower portion of the case, and handles 74 provide means for lifting and carrying the instrument. The case can be fabricated of a rigid, wear-resistant material such as fiber glass.

The instrument has a panel 76 which is covered when the cover 72 is in its closed position. The input terminals 11–14 of the system described above are mounted on this panel. Connections can be made to these terminals by means of test leads having clips at one end thereof. The meter 41 is also mounted on the panel. This meter is preferably of the zero-center type, and it is calibrated in appropriate units of voltage and resistance.

The distance reading dial 52 is mounted in the center of the panel below the meter 41. A distance multiplier switch 77 is mounted adjacent to the dial 52 and provides means for adjusting the reference voltage in a plurality of decade steps. Thus, for example, a reading of 415 on the dial 52 might indicate a distance of 415 feet, 4,150 feet or 41,500 feet, depending upon the setting of the switch 77.

A conductor gauge selector switch 78 and a conductor temperature control 79 are also mounted on the panel. A switch 78 is used to select the calibration resistor 27 for the particular wire size and material in the conductor under test. The control 79 is mounted on the shaft of the variable resistor 51 and provides means for adjusting this resistor to a value corresponding to the temperature of the conductor. A calibration control knob 81 is connected to the control shaft of the potentiometer 23 to provide means for adjusting the level of the current during calibration. An indicator lamp 82 mounted near the control knob 81 flashes if the resistance of a loop connected between the input terminals 11 and 13 exceeds a predetermined level. A switch 83 provides means for adjusting the sensitivity of the meter 41.

Controls 84 and 86 are provided for adjusting the magnitude and polarity of a voltage for off-setting a foreign voltage on the conductors connected to the input terminals. There controls function in a manner similar to the potentiometer 46 and the polarity reversing switch 61 of the system described above. A switch 87 provides means for switching the meter to check for proper cancellation of a foreign voltage during a distance measurement.

A function selector switch 88 provides means for selecting the function performed by the instrument. This switch functions in a manner similar to the switches 42, 43 and 44 of the system described above. It includes positions for voltage measurements, resistance measurement, distance measurements and battery checks. A separate switch 87 is provided for selecting the conductors on which the voltage and resistance measurements are made, and the switch 88 itself provides means for selecting the conductors or portions thereof on which distance measurements are made.

The instrument is powered by batteries mounted within the case. In normal use of the instrument, these batteries have an operating life on the order of 500 hours. In one presently preferred embodiment, the case has a length in the order of 12 inches, a depth in the order of 7 inches and a height on the order of 8 inches. The complete instrument, including batteries, weighs approximately 13 lbs.

The instrument shown in FIG. 2 has all of the desirable features of the system and method described above. In addition, this instrument is highly portable, easy to hook up and easy to operate.

It is apparent from the foregoing that a new and improved fault locator and method have been provided. While only the presently preferred embodiments have been described, as will be apparent to those familiar with the art, certain changes and modifications can be made without departing from the scope of the invention as defined by the following claims.

I claim:

1. In a compact highly portable instrument for locating resistance faults between the conductors of a cable, a cabinet of a size easily carried by a person, a first input terminal carried by the cabinet for connection to one of the conductors of the cable, current generating means within the cabinet for generating a current of predetermined substantially constant magnitude, means connecting the generating means to said first input terminal for passing the current of predetermined magnitude through the one conductor, additional input terminals carried by the cabinet for connection to conductors connected to a plurality of points along said one conductor, voltage sensing means selectively connectable to said input terminals for sensing the voltage drop produced by the current across a desired portion of said one conductor, a reference voltage source having a control for adjusting the level of the reference voltage produced thereby, said control having an operating dial accessible externally of the cabinet, said dial being calibrated in units of length, and means for comparing the voltage drop produced on the conductor with the reference voltage, whereby the length of the desired portion of the conductor can be read directly from the dial when the reference voltage is adusted to correspond to the voltage drop on the conductor.

2. An instrument as in claim 1 further including means for adjusting the level of the current produced by said generating means in accordance with parameters such as the size and temperature of the conductor connected to said first input terminal.

3. An instrument as in claim 1 wherein said control is a potentiometer and said dial comprises a digital counter connected to the control shaft of said potentiometer.

4. An instrument as in claim 1 wherein said reference source also includes means for adjusting the level of the reference voltage in accordance with parameters such as the temperature of the conductor connected to said first input terminal.

5. An instrument as in Claim 1 further including means within the cabinet connectable to a pair of the input terminals for measuring the resistance between the ends of conductors connectedthereto.

6. An instrument as in Claim 1 further including an adjustable voltage source within the cabinet and means for connecting said source to cancel out an undesired voltage between two conductors connected to the input terminals.

7. In a system for locating a resistance fault between first and second conductors in a cable having a plurality of conductors extending between proximate and remote stations, first and second input terminals connected respectively to the first and second conductors at the proximate station, third and fourth input terminals connected at the proximate station to the third and fourth conductors respectively, low resistance means interconnecting the first, third and fourth conductors at the remote station, a constant current source connected to said first and third input terminals for passing a current of predetermined magnitude through a loop including said first and third conductors, said current producing voltage drops along portions of said first conductor corresponding to the lengths of said portions, voltage sensing means connected to a pair of said input terminals for sensing the voltage drop produced across one portion of said first conductor, a reference voltage source having a control for adjusting the level of the voltage produced thereby, means for comparing the voltage drop produced across the portion of the conductor with the voltage produced by the source, and dial means forming a part of the control calibrated in units of length for indicating the length of the portion of the conductor when the source voltage is adjusted to correspond to the drop across the portion.

8. A fault locating system as in claim 7 wherein said voltage sensing means can be selectively connected to the first and fourth input terminals, to the first and second input terminals and to the second and fourth input terminals for sensing respectively, the voltage drops along the first conductor between the proximate and remote stations, between the proximate station and the fault and between the fault and the remote station.

9. A fault locating system as in claim 7 wherein the voltage sensing means has an impedance such that no more than about 1 microampere of current is drawn thereby.

10. In a method for locating a fault between first and second conductors in a cable having a plurality of conductors extending between proximate and remote stations, the steps of passing a current of predetermined magnitude through the first conductor, connecting voltage measuring means to measure the voltage drop produced by said current along a portion of said conductor, calibrating the operating dial of an adjustable voltage source in units of length, connecting said source to said voltage measuring means in such manner that said means indicates the difference in the magnitudes of the voltage drop along the portion of the conductor and the voltage from the source, adjusting the level of the voltage from the source to produce a zero reading on the voltage measuring means, and reading the length of the conductor portion directly from the operating dial of the voltage source when the zero reading is obtained.

11. A method as in claim 10 wherein the operating dial is calibrated by passing the current through an element having a resistance equal to a predetermined length of said first conductor, connecting the voltage measuring means to read the voltage drop across said element, setting the dial of the voltage source to said predetermined length, and adjusting the level of the current in the conductor so that the voltage drop across the element is equal in magnitude to the output of the source.

12. A method as in claim 10 together with the additional steps of adjusting the magnitude of the current passed through the first conductor in accordance with parameters such as the temperature and size of the conductors.

13. A method as in claim 10 together with the additional steps of connecting an ohmmeter to read the resistance between the first and second conductors at the proximate station before the current is passed through the first conductor.

14. A method as in claim 13 together with the additional steps of measuring the voltage between the conductors and applying an off-setting voltage between one of the conductors and the ohm-meter to cancel any external voltage between the conductors and prevent the external voltage from interfering with the operation of the ohmmeter.

* * * * *